No. 773,768. PATENTED NOV. 1, 1904.
W. H. SCHORLING.
MOLDING MACHINE.
APPLICATION FILED JAN. 21, 1904.
NO MODEL. 2 SHEETS—SHEET 1.
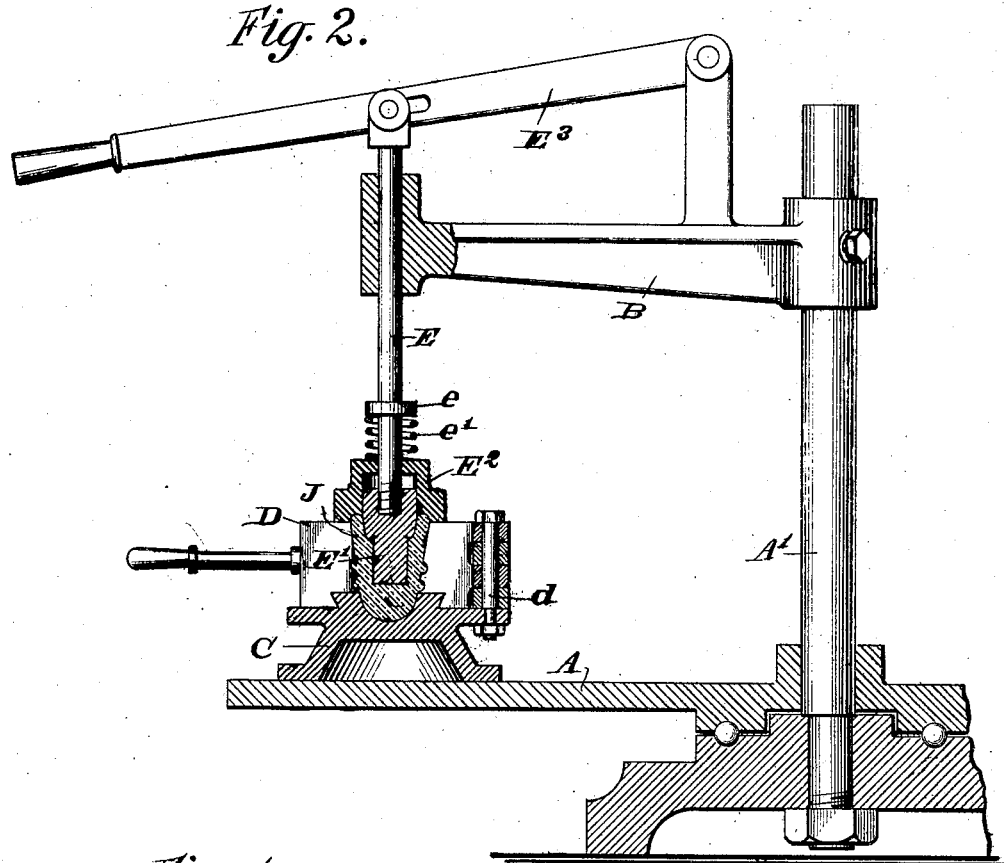
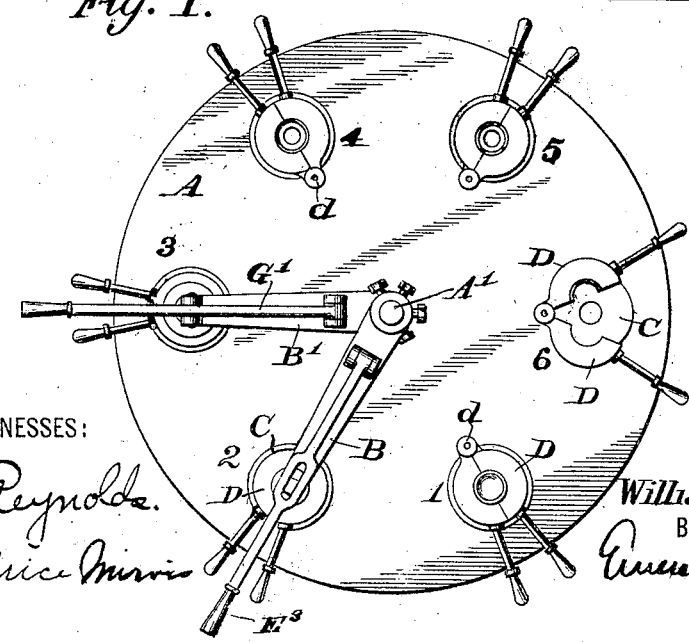
WITNESSES:
H. L. Reynolds.
Beatrice Mirvis
INVENTOR
William H. Schorling.
BY
ATTORNEY No. 773,768. PATENTED NOV. 1, 1904.
W. H. SCHORLING.
MOLDING MACHINE.
APPLICATION FILED JAN. 21, 1904.
NO MODEL. 2 SHEETS—SHEET 2.
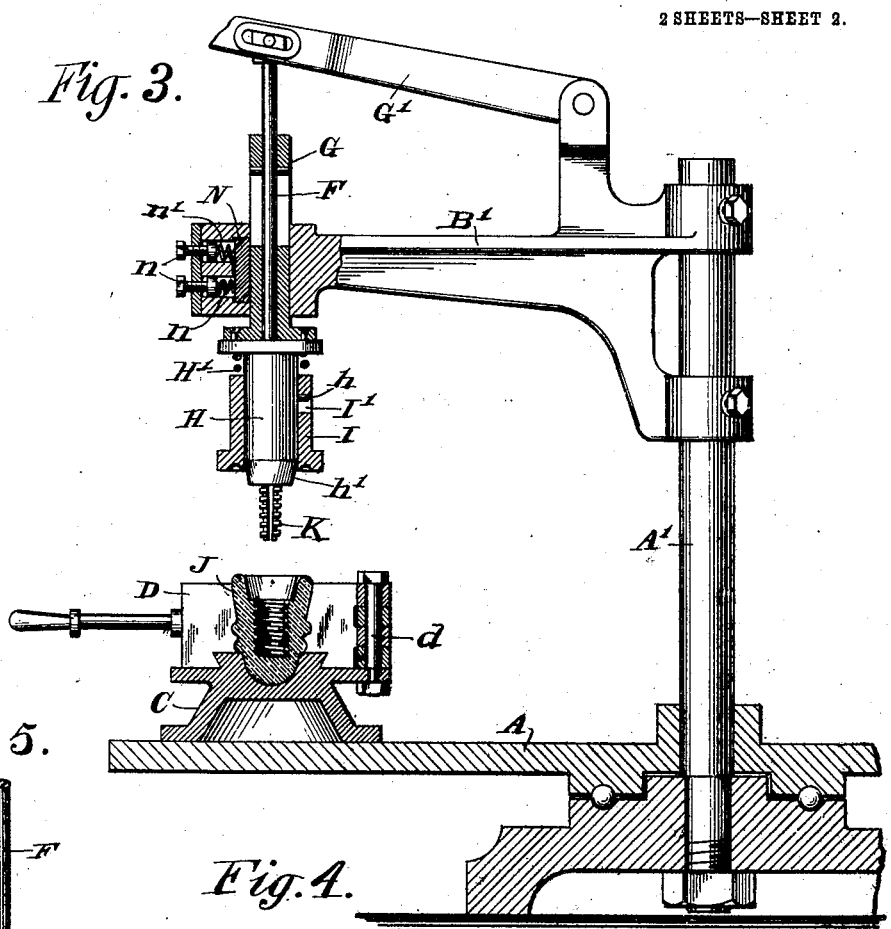
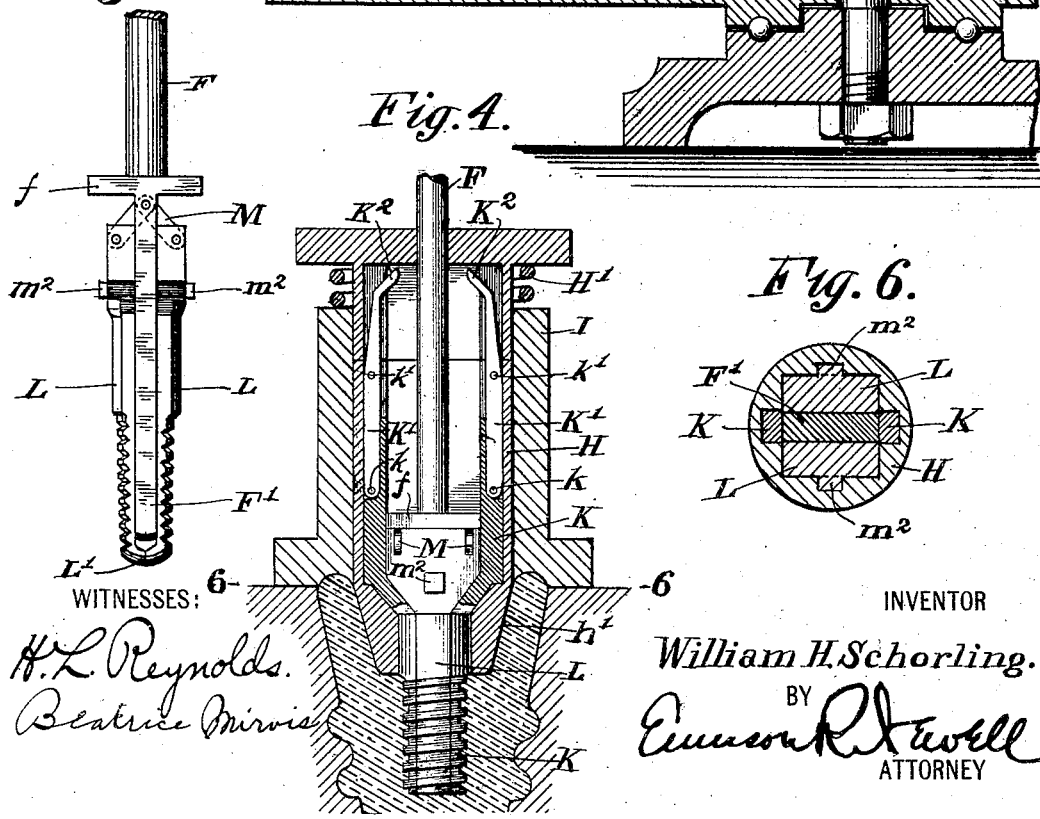
WITNESSES:
H. L. Reynolds.
Beatrice Mirvis.
INVENTOR
William H. Schorling.
BY
Emerson R. Newell
ATTORNEY No. 773,768.  
Patented November 1, 1904.

UNITED STATES PATENT OFFICE.

WILLIAM H. SCHORLING, OF BROOKLYN, NEW YORK, ASSIGNOR TO HENRY M. BROOKFIELD, OF NEW YORK, N. Y.

MOLDING-MACHINE.

SPECIFICATION forming part of Letters Patent No. 773,768, dated November 1, 1904.

Application filed January 21, 1904. Serial No. 190,045. (No model.)

*To all whom it may concern:*

Be it known that I, WILLIAM H. SCHORLING, a citizen of the United States, residing at Brooklyn, New York, have invented certain new and useful Improvements in Molding-Machines, of which the following is a clear, full, and exact description.

My invention relates to an improvement in machines for molding articles having a screw-threaded recess from plastic materials, especially glass insulators.

The object of my invention is to improve and simplify the construction and operation of such machines.

My invention will be defined in the claims terminating this specification.

The drawings accompanying herewith illustrate my invention embodied in a form now preferred by me.

Figure 1 is a plan view of the turn-table of my machine and the parts coöperating therewith to mold the insulators. Fig. 2 is a sectional elevation of a portion of the turn-table and a mechanism employed for roughing out the insulators. Fig. 3 is a sectional elevation showing a part of the turn-table and the mechanism employed for finishing the molding of the insulator. Fig. 4 is a sectional elevation through a portion of the mechanism employed for finishing the molding of the insulator. Fig. 5 is an elevation of a portion of the parts shown in Fig. 4, but viewed from a point at right angles to that chosen for Fig. 4; and Fig. 6 is a section on line 6 6 of Fig. 4.

In the prior art it has been sought to mold hollow articles, such as glass insulators, provided with an interior screw-thread for the reception of a supporting pin or bracket by using a laterally-collapsible threaded plunger or former which is pressed into the plastic glass in the mold while in its expanded position and is then collapsed before withdrawal. In practical use these devices have not been found to be successful, as the threads of the insulators were imperfectly formed and mutilated. The process used in forming insulators by such means relied upon the threaded plunger or mold as the sole means for forming the interior surfaces of the insulator. To attain a satisfactory speed of operation, this could not be permitted to remain in the glass any considerable time. In consequence the glass composing the threads and the entire inner surface of the insulator did not have time to become set so but that it would be easily mutilated or deformed when the plunger was withdrawn. This was caused by the glass sticking to the former. Instead of relying upon this as the sole means for forming the inner surfaces of the insulator I provide a smooth-surfaced mold or plunger which is first inserted into the glass, thus blocking or roughing out a hole in the insulator to an approximation of its finished dimensions, and then after the withdrawal of this preliminary or roughing plunger I insert the finishing-plunger to form the threads and otherwise complete the molding operation. The preliminary plunger partially cools or sets the surfaces with which it contacts, and the screw-threaded finishing-plunger further cools them to such a point that they will retain their shape when this plunger is collapsed for withdrawal.

A mechanism which I have employed for this work is shown in the accompanying drawings. This comprises a mold-carrier, preferably a turn-table A, mounted to turn upon a suitable support and having thereon a series of molds C D, adapted to form the outer surfaces of the insulator, six of said molds being shown as carried by the turn-table and indicated in their various positions by Figs. 1, 2, 3, 4, 5, and 6. These molds each consists of a base C and two parts D, pivoted at *d* upon said base so as to swing laterally to separate and permit the extraction of the insulator after it has been molded. I have mounted the preliminary or roughing plunger and the finishing-plunger upon suitable supports, located so as to register with adjacent molds upon the turn-table.

The first or roughing plunger is shown in Fig. 2. This comprises a rod E, mounted to vertically slide in a bearing in an arm B, which is supported in any convenient manner, as from a central shaft A'. The plunger-rod E carries upon its lower end the roughing-plunger E', which is shaped to approximately correspond to the shape of the opening in the finished insulator. Its surfaces are, however, such as will enable it to be withdrawn from the glass without mutilating the same. In size the lower portion of this plunger is slightly larger in diameter than the threaded portion of the finishing-plunger, so that the latter may be inserted without mutilating the side surfaces of the previously-formed recess, and this roughing-plunger is preferably shorter than the finishing-plunger for a purpose to be hereinafter explained. The plunger E' is preferably surrounded with a cap E², adapted to close the mold and contact with the lower edge of the insulator, said lower edge being uppermost during the process of molding. This cap E² is preferably held down in a yielding manner, as by means of a spring e', which bears against the upper surfaces of the cap and against a collar e upon the plunger-rod E. This plunger-rod is reciprocated by any suitable means under the control of the operator, the means herein shown consisting of a lever E³, which is pivotally supported from the arm B. Any suitable means for reciprocating the plunger may, however, be employed. The operation of the above device results in roughly blanking out or approximately shaping the insulator, but does not give it the screw-threads which are commonly employed as a means for securing the insulator to the wooden pin or bracket by which it is usually supported. The finishing of the insulator is done at the next position of the molds.

The mechanism by which the inner surface of the insulator is completed is shown in Figs. 3, 4, 5, and 6. An arm B', extending from the central post A, has in its outer end a guide, within which reciprocates a plunger G, said plunger being held in whatever position it may be left by means of a friction device consisting of a block N, bearing against one side of the plunger G and held against the same by means of springs n', adjustable in tension by bolts n. The plunger G is in line with the position of the mold and upon its lower end carries a cylinder H, the extreme lower end of which is shaped to form a portion of the inner surface of the insulator. As herein shown, this cylinder H is hollow and has within it four members, which are adapted to form the screw-threaded portion of the insulator, each representing a longitudinal section of the screw-surface. These four members are divided into pairs, two of which, K, are pivoted near their upper ends by pins k to pairs of levers K', which in turn are pivoted by the pins k' upon the cylinder H. The upper ends of the levers K' are provided with inwardly-projecting toes K² for a purpose hereinafter specified. The members K are inwardly offset near their lower ends, and that portion thereof which projects beyond the end of the cylinder H is exteriorly shaped to form opposite longitudinal sections of the screw-thread desired in the insulator. This collapsible screw is not claimed herein by itself alone. The rod F is free to slide through the upper end of the cylinder H and within said cylinder is provided with a head f, to which are pivoted two screw-threaded members L, which members are exteriorly shaped to form opposite longitudinal sections of the screw-thread desired in the insulator. The threaded portions of the members L and K are of such size that when placed together they will form a complete threaded rod. The members L are pivoted at their upper ends by means of links M to an extension F' of the rod F. In Fig. 4 these members L are shown in their upper position—that is, with their upper ends in contact with the head f—while in Fig. 5 they are shown in their lower position. The extension F' of the rod F lies between the two members L and is adapted to engage by its lower end the beveled toes L' of said members L, and thus to act as a wedge to spread and hold these members apart.

The position of the parts shown in Fig. 4 is that occupied when in place within the insulator and forming the threads thereof. In this position the lugs m² enter recesses in the walls of the cylinder H. If now the rod F should be raised, as by throwing upward the lever G, to which the rod is connected, the first action would be to withdraw the extension F', the lugs m² holding back the sections L. This causes the sections L to swing laterally together at their lower ends, thereby being pulled out of the threads formed in the insulator. As the rod F is raised the sections L would be entirely withdrawn from between the threaded lower portions of the members K. The head f would then strike the toes K², so as to throw the lower ends of the levers K' inwardly, thus throwing the threaded lower ends of the members K toward the center or laterally and freeing them from the threads in the insulator. The whole device would then be raised out of the insulator. In this way the screw is freed from the glass by collapsing laterally.

The cylinder H is shown as surrounded by a sleeve I, the lower surface of which is shaped to form the lower edge of the insulator. This is shown as held down by a spring H'. I have discovered that by using this preliminary or roughing plunger insulators may be more perfectly and reliably formed than if the final forming mechanism, such as is shown in Figs. 3 to 6, is relied upon for the complete operation of molding. The preliminary molding operation forms a recess for the reception of the thread-forming device, so that this device does not have to seriously displace the glass, as would be required if the preliminary operation was not performed. It is also believed that the preliminary molding operation serves to partially chill the surface of the glass, and thus enable the finishing device to form a more perfect thread than if this preliminary operation was not performed.

Preferably the preliminary or roughing plunger should leave a portion or portions of the glass so that it must be displaced by the finishing mold or plunger, thus causing the glass to flow to such an extent as to insure perfect filling of the threads or other recesses in the mold. This may be done by having the preliminary or roughing plunger a little shorter or by having its upper or enlarged head a little smaller than the corresponding portion of the finishing-plunger or by both expedients. In this way the lower portion of the roughing or preliminary plunger may be made sufficiently large to permit free insertion of the threaded portion of the finishing-plunger into the hole in the glass made thereby and the filling of the threads secured by displacement of the glass by some other portion of the plunger. This displacement of the glass so as to fill the threads may, however, be done in other ways.

What I claim is—

1. In a machine for molding screw-threaded insulators and like articles from plastic materials, in combination, means for forming a hole in the plastic mass, a collapsible finishing member adapted to be inserted in said hole, and means for displacing portions of said plastic mass to thereby cause it to flow to fill the recessed portions of the finishing member, and means for laterally collapsing said finishing member to free it from the projections upon the molded article to thereby permit its withdrawal.

2. In a machine for molding articles from a plastic material, in combination, a mold adapted to receive the plastic material, a former, and means for inserting it into the plastic mass and then withdrawing it to form a hole therein, a collapsible screw adapted to be inserted in said hole in an expanded condition, means for producing pressure upon the plastic material to cause it to flow and fill the screw-threads, and means for collapsing said screw in a lateral direction to free its threads from the plastic material before it is withdrawn.

3. In a machine for molding glass articles in combination, a mold for forming the outer surface of said article, a roughing-plunger mounted to reciprocate to enter the plastic glass in said mold to roughly form a hole therein, and a threaded finishing-plunger mounted to reciprocate to enter said hole in said glass in said mold to form a thread upon the inner surface of said hole, said roughing-plunger being of greater diameter than the threaded portion of said finishing-plunger, and means for causing pressure upon the glass to cause it to flow and enter the threads upon said finishing-plunger.

4. In a machine for molding glass insulators, in combination, a turn-table, a series of molds thereon for forming the outer surfaces of the insulators, a roughing-plunger mounted to reciprocate to enter the plastic glass in one mold to roughly form the recesses therein, and a finishing-plunger mounted to reciprocate above another mold and having a plurality of forming parts adapted to be inserted within the previously-formed recess to finish molding the interior surfaces of the insulator, and means for collapsing said finishing-plunger to withdraw it from the insulator.

Signed at New York, N. Y., this 20th day of January, 1904.

WILLIAM H. SCHORLING.

Witnesses:
 FRANCES L. LEWIS,
 BEATRICE MIRVIS.